United States Patent [19]

Laenger, Sr. et al.

[11] 4,074,444
[45] Feb. 21, 1978

[54] METHOD AND APPARATUS FOR COMMUNICATING WITH PEOPLE

[75] Inventors: Charles J. Laenger, Sr.; Sam R. McFarland; Harry H. Peel, all of San Antonio, Tex.

[73] Assignee: Southwest Research Institute, San Antonio, Tex.

[21] Appl. No.: 728,404

[22] Filed: Sept. 30, 1976

[51] Int. Cl.$^2$ ............................................. G09B 21/04
[52] U.S. Cl. ....................................... 35/35 A; 35/17; 340/407
[58] Field of Search ...................... 35/35 R, 35 A, 17; 3/12.7; 340/407

[56] References Cited

U.S. PATENT DOCUMENTS

| | | | |
|---|---|---|---|
| 2,528,322 | 10/1950 | Syverud et al. | 3/12.7 |
| 2,641,769 | 6/1953 | Robinson | 3/12.7 |
| 2,972,140 | 2/1961 | Hirsch | 35/35 A X |
| 3,831,296 | 8/1974 | Hagle | 35/35 A |

Primary Examiner—William H. Grieb

[57] ABSTRACT

A method and apparatus for communicating with people who are both deaf and blind is disclosed. The apparatus comprises a keyboard controlled electromechanical hand. The electromechanical hand is programmed to form the letters of the standard one-hand manual alphabet through the use of an electronic buffer between the electric typewriter and the electromechanical hand. The buffer converts the electric typewriter code into separate control signals for each letter of the alphabet. Next, the buffer uses the alphabet control signals to move the hand in a manner simulating the one-hand manual alphabet code. Deaf and/or deaf and blind people feel the configurations of the electromechanical hand and are able to identify the letters. This provides an effective means of communication by persons who do not know the one-hand manual alphabet with people who are deaf and blind.

12 Claims, 14 Drawing Figures

FIG. 8

TABLE II

| | Index Finger | Index Finger | Ring Finger & Index Finger (ring right)(index left) | Middle Finger | Middle Finger | Ring Finger | Ring Finger | Little Finger | Little Finger | Thumb | Thumb | Thumb (down) | Wrist (down) | Wrist (right) |
|---|---|---|---|---|---|---|---|---|---|---|---|---|---|---|
| | \multicolumn{14}{c}{SOLENOIDS} |
| | $I_2$ | $I_3$ | $R_B I_B$ | $M_1$ | $M_3$ | $R_1$ | $R_3$ | $L_1$ | $L_3$ | $T_2$ | $T_3$ | $T_B$ | $W_B$ | $W_T$ |
| | 1 | 2 | 3 | 4 | 5 | 6 | 7 | 8 | 9 | 10 | 11 | 12 | 13 | 14 |
| A | 0 | 1 | 0 | 0 | 1 | 0 | 1 | 0 | 1 | 1 | 0 | 0 | 0 | 0 |
| B | 1 | 0 | 0 | 1 | 0 | 1 | 0 | 1 | 0 | 1 | 1 | 0 | 0 | 0 |
| C | 0 | 0 | 0 | 0 | 0 | 0 | 0 | 0 | 0 | 1 | 0 | 1 | 0 | 0 |
| D | 1 | 0 | 0 | 0 | 1 | 0 | 1 | 0 | 1 | 1 | 0 | 1 | 0 | 0 |
| E | 0 | 1 | 0 | 0 | 1 | 0 | 1 | 0 | 1 | 1 | 1 | 0 | 0 | 0 |
| F | 0 | 1 | 0 | 1 | 0 | 1 | 0 | 1 | 1 | 1 | 1 | 0 | 0 | 0 |
| G | 1 | 0 | 0 | 0 | 1 | 0 | 1 | 0 | 1 | 1 | 0 | 0 | 0 | 1 |
| H | 1 | 0 | 0 | 1 | 0 | 0 | 1 | 0 | 1 | 1 | 0 | 0 | 0 | 1 |
| I | 0 | 1 | 0 | 0 | 1 | 0 | 1 | 0 | 0 | 1 | 1 | 1 | 0 | 0 |
| J | 0 | 1 | 0 | 0 | 1 | 0 | 1 | 0 | 0 | 1 | 1 | 1 | 0 | $*1_D$ |
| K | 1 | 0 | 0 | 0 | 0 | 0 | 1 | 0 | 1 | 1 | 0 | 0 | 0 | 0 |
| L | 1 | 0 | 0 | 0 | 1 | 0 | 1 | 0 | 1 | 0 | 0 | 0 | 0 | 0 |
| M | 0 | 0 | 0 | 0 | 0 | 0 | 0 | 0 | 1 | 1 | 1 | 1 | 1 | 0 |
| N | 0 | 0 | 0 | 0 | 0 | 0 | 1 | 0 | 1 | 1 | 1 | 1 | 1 | 0 |
| O | 0 | 0 | 0 | 0 | 0 | 0 | 0 | 0 | 0 | 1 | 1 | 1 | 0 | 0 |
| P | 1 | 0 | 0 | 0 | 0 | 0 | 1 | 0 | 1 | 1 | 0 | 0 | 1 | 0 |
| Q | 1 | 0 | 0 | 0 | 0 | 0 | 0 | 0 | 0 | 1 | 0 | 1 | 1 | 0 |
| R | 0 | 0 | 0 | 1 | 0 | 0 | 1 | 0 | 1 | 1 | 1 | 1 | 0 | 0 |
| S | 0 | $*1_D$ | 0 | 0 | $*1_D$ | 0 | 1 | 0 | 1 | 1 | 1 | 1 | 0 | 0 |
| T | 0 | 1 | 1 | 0 | 1 | 0 | 1 | 0 | 1 | 1 | 0 | 1 | 0 | 0 |
| U | 1 | 0 | 0 | 1 | 0 | 0 | 1 | 0 | 1 | 1 | 1 | 1 | 0 | 0 |
| V | 1 | 0 | 1 | 1 | 0 | 0 | 1 | 0 | 1 | 1 | 1 | 1 | 0 | 0 |
| W | 1 | 0 | 1 | 1 | 0 | 1 | 0 | 0 | 1 | 1 | 1 | 1 | 0 | 0 |
| X | 0 | 0 | 0 | 0 | $*1_D$ | 0 | $*1_D$ | 0 | $*1_D$ | 1 | 1 | 0 | 0 | 0 |
| Y | 0 | 1 | 0 | 0 | 1 | 0 | 1 | 1 | 0 | 0 | 0 | 0 | 0 | 0 |
| Z | 1 | 0 | 0 | 0 | 1 | 0 | 1 | 0 | 1 | 1 | 0 | 1 | 0 | $1_S^{**}$ |

| TYPEWRITER CODE | | | | | | |
|---|---|---|---|---|---|---|
| $b_1$ | $b_2$ | $b_3$ | $b_4$ | $b_5$ | $b_6$ | $b_7$ |
| 1 | 0 | 0 | 0 | 0 | 0 | 1 |
| 0 | 1 | 0 | 0 | 0 | 0 | 1 |
| 1 | 1 | 0 | 0 | 0 | 0 | 1 |
| 0 | 0 | 1 | 0 | 0 | 0 | 1 |
| 1 | 0 | 1 | 0 | 0 | 0 | 1 |
| 0 | 1 | 1 | 0 | 0 | 0 | 1 |
| 1 | 1 | 1 | 0 | 0 | 0 | 1 |
| 0 | 0 | 0 | 1 | 0 | 0 | 1 |
| 1 | 0 | 0 | 1 | 0 | 0 | 1 |
| 0 | 1 | 0 | 1 | 0 | 0 | 1 |
| 1 | 1 | 0 | 1 | 0 | 0 | 1 |
| 0 | 0 | 1 | 1 | 0 | 0 | 1 |
| 1 | 0 | 1 | 1 | 0 | 0 | 1 |
| 0 | 1 | 1 | 1 | 0 | 0 | 1 |
| 1 | 1 | 1 | 1 | 0 | 0 | 1 |
| 0 | 0 | 0 | 0 | 1 | 0 | 1 |
| 1 | 0 | 0 | 0 | 1 | 0 | 1 |
| 0 | 1 | 0 | 0 | 1 | 0 | 1 |
| 1 | 1 | 0 | 0 | 1 | 0 | 1 |
| 0 | 0 | 1 | 0 | 1 | 0 | 1 |
| 1 | 0 | 1 | 0 | 1 | 0 | 1 |
| 0 | 1 | 1 | 0 | 1 | 0 | 1 |
| 1 | 1 | 1 | 0 | 1 | 0 | 1 |
| 0 | 0 | 0 | 1 | 1 | 0 | 1 |
| 1 | 0 | 0 | 1 | 1 | 0 | 1 |
| 0 | 1 | 0 | 1 | 1 | 0 | 1 |

*D means delay  **S means sequence

TABLE IIa       FIG. 8a

FINGER POSITIONS

| Wrist (W) | Index Finger (I) | Middle Finger (M) | Ring Finger (R) | Little Finger (L) | Thumb (T) | First Motion | Second Motion | Third Motion |
|---|---|---|---|---|---|---|---|---|
| 1A | 3A | 3 | 3A | 3 | 2A | IMRLT | | |
| 1A | 1A | 1 | 1A | 1 | 3A | IMRLT | | |
| 1A | 2A | 2 | 2A | 2 | 2B | T | | |
| 1A | 1A | 3 | 3A | 3 | 2B | IMRLT | | |
| 1A | 3A | 3 | 3A | 3 | 3B | IMRLT | | |
| 1A | 3A | 1 | 1A | 1 | 2A | IMRLT | | |
| 1B | 1A | 3 | 3A | 3 | 2A | IMRLTW | | |
| 1B | 1A | 1 | 3A | 3 | 2A | IMRLTW | | |
| 1A | 3A | 3 | 3A | 1 | 3B | IMRLT | | |
| 1B-1A | 3A | 3 | 3A | 1 | 3B | IMRLT | W | |
| 1A | 1A | 2 | 3A | 3 | 2A | IRLT | | |
| 1A | 1A | 3 | 3 | 3 | 1A | IMRL | | |
| 2A | 2A | 2 | 2A | 3 | 3B | WLT | | |
| 2A | 2A | 2 | 3A | 3 | 3B | WRLT | | |
| 1A | 2A | 2 | 2A | 2 | 3B | T | | |
| 2A | 1A | 2 | 3A | 3 | 2A | WIRLT | | |
| 2A | 1A | 2 | 2A | 2 | 2B | WIT | | |
| 1A | 2A | 1 | 3A | 3 | 3B | IMRLT | | |
| 1A | 3A | 3 | 3A | 3 | 3B | RLT | IM | |
| 1A | 3B | 3 | 3A | 3 | 3B | IMRLT | | |
| 1A | 1A | 1 | 3A | 3 | 3B | IMRLT | | |
| 1A | 1B | 1 | 3B | 3 | 3B | IMRLT | | |
| 1A | 1B | 1 | 1B | 3 | 3B | IMRLT | | |
| 1A | 2A | 3 | 3A | 1 | 1A | T | MRL | |
| 1A | 3A | 3 | 3A | 1 | 1A | IMRLT | | |
| 1B-2A-2B | 1A | 3 | 3A | 3 | 2B | WIMRLT | W | W |
| Rest 1A | 2A | 2 | 2A | 2 | 1A | | | |

METHOD AND APPARATUS FOR COMMUNICATING WITH PEOPLE

BACKGROUND OF THE INVENTION

Communicating with individuals who cannot see nor hear is often very difficult. These individuals, because of their handicaps, are informationally deprived. Since few such individuals learn Braille, the almost universal mode of communication with the deaf and blind is the one-hand alphabet. Since there are only a few non-deaf people who know the one-hand alphabet, the deaf-blind individuals are limited to the number of people with whom they can communicate. Since the deaf-blind have so little opportunity to communicate, many of them are functionally retarded. Because they cannot see, it is necessary for them to feel configurations of the hand forming the one-hand alphabet thereby requiring physical contact with the person with whom they are communicating.

Other electromechanical means for "hands-off" communication with the deaf-blind are difficult and require the deaf-blind to learn a new code. For example, electro-stimulation via skin surface electrodes requires the learning of a new code, and presents the additional problem of maintaining a reliable and constant level of stimulation.

The one-hand manual alphabet can be found in Riekehof, *Talk To The Deaf*, Gospel Publishing House, 1445 Boonville Ave., Springfield, Mo., p.1 (Library of Congress, No. 63-17975). A copy of the one-hand manual alphabet is included with this application.

SUMMARY OF THE INVENTION

The present invention provides a means and apparatus for communicating with deaf and blind persons through the use of an electromechanical hand which forms letters of the one-hand manual alphabet. The hand is controlled by an electronic buffer that converts signals from the electric typewriter code to the one-hand manual alphabet code. The electronic buffer includes selection means to activate the electromechanical hand to form separate letters of the manual alphabet upon receiving control signals for each letter of the alphabet through a decoding section of the electronic buffer. The hand is programmed to proceed directly from one letter to another without return to a neutral position, if the next letter input has been received. A rest period for the electromechanical hand can be recognized by the deaf-blind as being the end of the sequence of letters forming a word. Practice will enable the deaf-blind to follow messages at higher repetition rates. With practice, the deaf-blind will be able to follow messages converted from 60 words-per-minute teletype signals into the one-hand alphabet.

It is the primary object of this invention to provide a method of communication with individuals who are both deaf and blind.

It is a further object of this invention to provide an apparatus for communicating with individuals who are both deaf and blind.

It is another object of this invention to provide a system for converting typewriter and teletype signals into the manual one-hand alphabet signals being simulated by an electromechanical hand.

It is still another objective of this invention to provide a "hands-off" communication system for deaf-blind persons so that persons unfamiliar with the one-hand alphabet can communicate with the deaf-blind without being in direct contact.

These and other advantages, features and objects of the invention will become more apparent from the following description taken in connection with the illustrative embodiment in the accompanying drawings.

BRIEF DESCRIPTION OF THE DRAWINGS

FIG. 8 shows TABLE II of the invention.

FIG. 8a shows TABLE IIa of the invention.

DESCRIPTION OF THE PREFERRED EMBODIMENT

The most universal method of communication with a person who is both deaf and blind is through use of the one-hand manual alphabet. By use of the one-hand manual alphabet, a person that is both deaf and blind would place his left hand on the right hand of a second person. Likewise, the second person would place his left hand on the right hand of the person that is both deaf and blind. As the deaf-blind person forms the characters of the one-hand manual alphabet with his right hand, the second person can read the hand signals, either visually or by feeling the hand. Likewise, the second person can communicate to the deaf-blind person by forming letters of the one-hand manual alphabet with his right hand. A deaf-blind person would feel the letters formed with his left hand.

However, deaf and blind persons have considerable problems communicating because so few individuals know the one-hand manual alphabet. Also, normal methods of communication by sound or sight seriously deprive deaf and blind persons of information. By use of the present invention of a electromechanical hand, other people who do not know the one-hand manual alphabet can communicate with the deaf-blind by use of the standard typewriter keyboard. A person that is deaf and blind could communicate with anyone by typing messages on a standard typewriter. Most deaf-blind persons can type or learn to type without great difficulty.

By use of the electromechanical hand shown in FIG. 1 as will be hereinafter described, a whole new field of communication has opened up for persons who are both deaf and blind, including the possibility of receiving teletype communications from distant points. This would also allow a deaf-blind person to "read" a book from a recording that could easily be made at the same time as the book is typed. The recording could be played and "translated" through the mechanical hand, thereby enabling the deaf-blind person to "read" the book.

Figure 1:
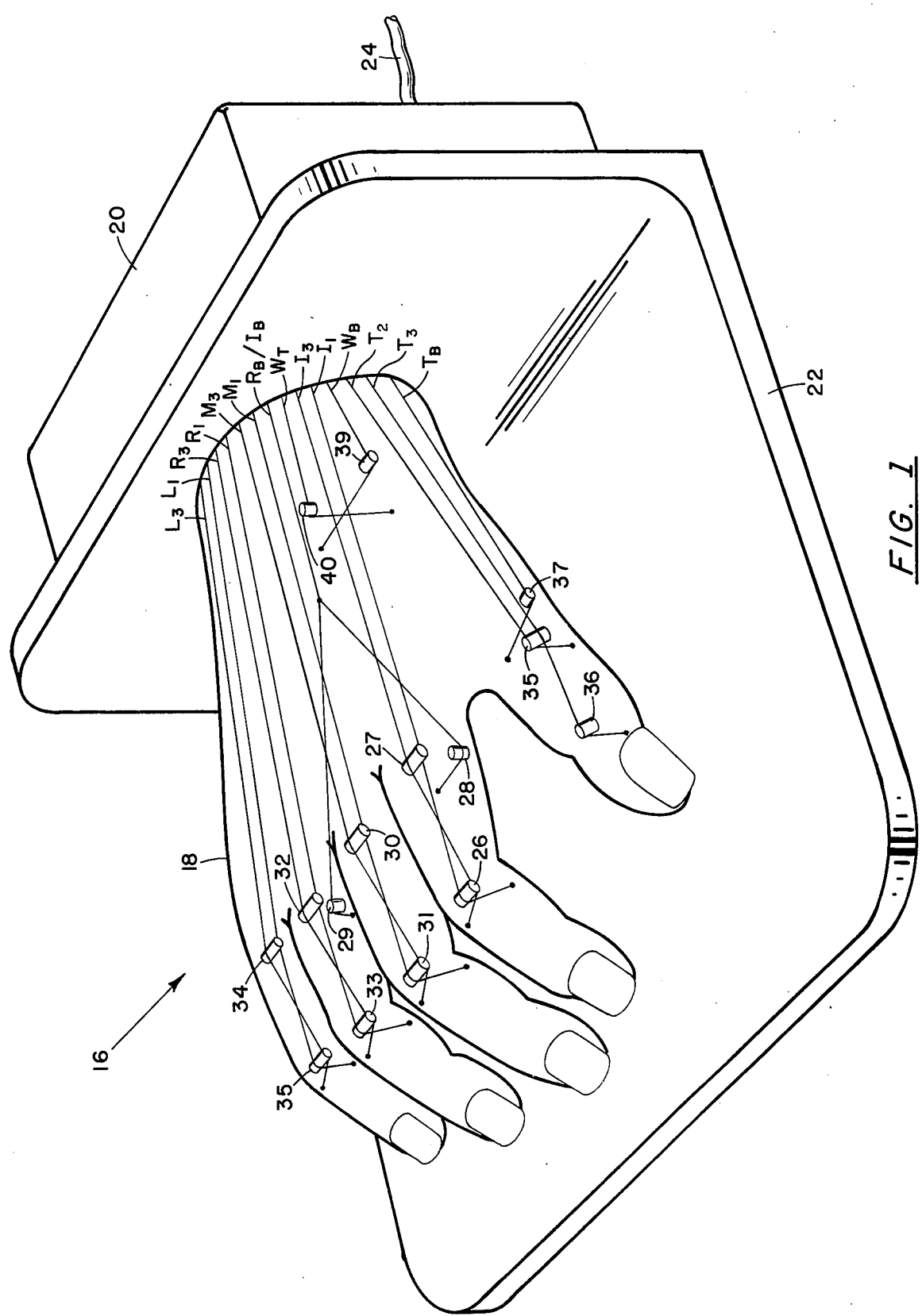
FIG. 1 is an illustrative perspective view of a mechanical hand utilizing the present invention.

Referring to FIG. 1 of the drawings, there is shown an electromechanical hand represented generally by reference numeral 16. The hand 18 is controlled by a series of cables, wires, rods or filaments that connect to actuators such as solenoids, motors, or other electrical drivers located in control box 20. For the purposes of this invention, the actuators will be solenoids and the control box 20 will hereinafter be called a solenoid control box 20; however, other types of actuators may be used. The hand 18 and solenoid control box 20 are located on a support structure 22.

The solenoid control box 20 receives inputs through input cable 24, which inputs will be subsequently described in more detail. Pursuant to input signals received through input cable 24, one or more solenoids contained in solenoid control box 20 would be activated thereby pulling any one of the fourteen cables or filaments connecting to the hand 18. The various positions of the fingers, thumb and wrist of the hand 18 as controlled by the solenoids in solenoid control box 20 are as follows:

TABLE I

| Solenoid No. | Finger/Thumb/Wrist Position | Movement |
|---|---|---|
| 1 | $I_1$ | Index finger straight |
| 2 | $I_3$ | Index finger closed |
| 3 | $I_B/R_B$ | Index finger left/Ring finger right |
| 4 | $M_1$ | Middle finger straight |
| 5 | $M_3$ | Middle finger closed |
| 6 | $R_1$ | Ring finger straight |
| 7 | $R_3$ | Ring finger closed |
| 8 | $L_1$ | Little finger straight |
| 9 | $L_3$ | Little finger closed |
| 10 | $T_2$ | Thumb half closed |
| 11 | $T_3$ | Thumb fully closed |
| 12 | $T_B$ | Thumb down |
| 13 | $W_B$ | Wrist down |
| 14 | $W_T$ | Wrist right |

The various positions of the fingers and thumb can be more clearly seen in illustrative FIGS. 7a–7d.

Without describing how the control signals are generated that are received through cable inputs 24 (which control signals will be subsequently described in more detail), movement caused by the energization of each solenoid will be described hereinbelow in conjunction with FIG. 1. When solenoid 1 is energized, the index finger is straightened by pulling cable $I_1$. By pulling cable $I_3$ upon the energization of solenoid 2, the index finger will be closed. Vertical movement of the index finger occurs about pivot points 26 and 27. Upon energization of solenoid 3, cable $R_B/I_B$ is pulled thereby causing the index finger to move to the left about pivot point 28, and the ring finger to move to the right about pivot point 29.

Upon the energization of solenoid 4, the middle finger will straighten by pulling cable $M_1$. Likewise, by the energization of solenoid 5, the middle finger will close by pulling cable $M_3$. Vertical movement of the middle finger occurs around pivot points 30 and 31.

By the energization of solenoid 6, cable $R_1$ is pulled thereby straightening the ring finger. Likewise, by energization of solenoid 7, cable $R_3$ is pulled thereby closing the ring finger. The ring finger has vertical movement by pivoting about pivot points 32 and 33.

By the energization of solenoid 8, cable $L_1$ is pulled thereby straightening the little finger. Likewise, by energizing solenoid 9, cable $L_3$ is pulled thereby closing the little finger. Vertical movement of the little finger occurs about pivot points 34 and 35.

By the energization of solenoid 10, cable $T_3$ is pulled thereby moving the thumb to the half-closed position. By the energization of solenoid 11, which automatically energizes solenoid 10, cable $T_3$ is also pulled thereby moving the thumb to the fully closed position. Horizontal movement of the thumb occurs about pivot points 35 and 36. By the energization of solenoid 12, cable $T_B$ is pulled thereby moving the thumb down. Vertical movement of the thumb occurs about pivot point 37.

By the energization of solenoid 13, cable $W_B$ is pulled thereby moving the entire hand 18 down, with motion being about pivot point 39. By the energization of solenoid 14, cable $W_T$ is pulled thereby moving the entire hand 18 to the right with motion being about pivot point 40.

The position for the hand 18 as shown in FIG. 1 is the rest position wherein none of the solenoids 1–14 are energized. By proper selection of solenoids 1–14, each of the characters of the one-hand manual alphabet can be formed, or very closely approximated, so that a deaf and blind person feeling the mechanical hand 18 can recognize the characters of the one-hand manual alphabet being formed.

Figure 2:
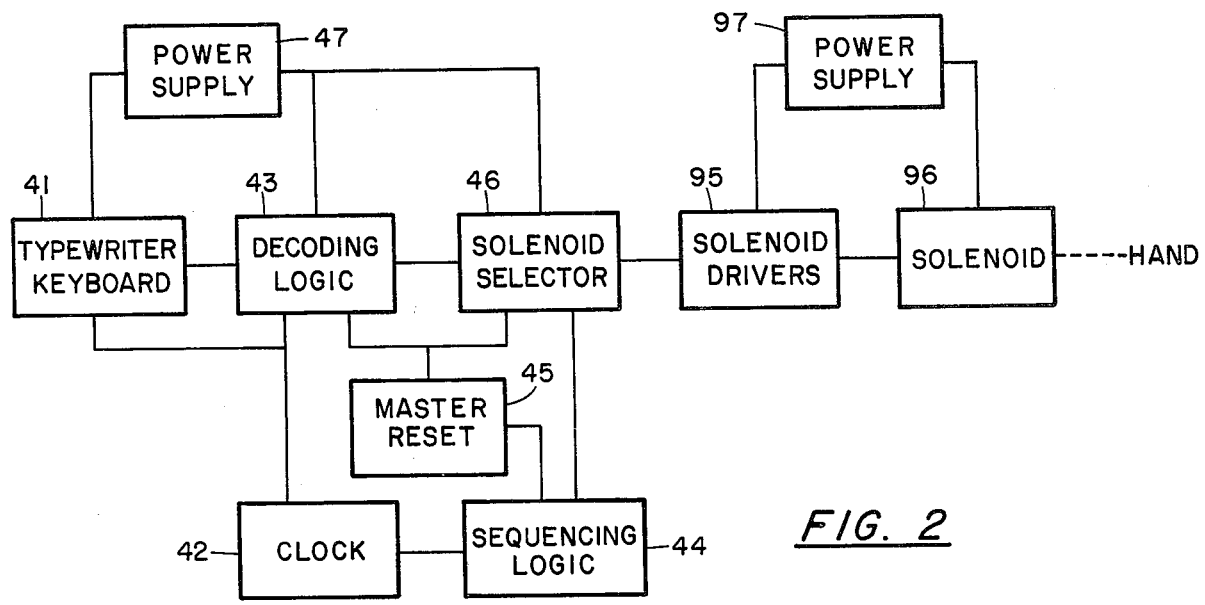
FIG. 2 is a block diagram illustrating electrical connections between a typewriter keyboard and the mechanical hand.

Referring now to FIG. 2, there is shown a block diagram of the electrical connections necessary for operation of the hand 18. The typewriter keyboard 41 should be of a standard type, such as an ASC II keyboard. For the purpose of the present invention, applicants have assumed that the typewriter keyboard 41 uses the standard code for information interchange as is found in *USA Standard Code for Information Interchange* (USA SC II) X 3.4-1957, USA Standards Institute; or *Reference Data for Radio Engineers*, 5th Ed., 1972, Howard W. Sams & Company, Inc., pp. 30–44 (Library of Congress No. 43-14655).

Figure 3:
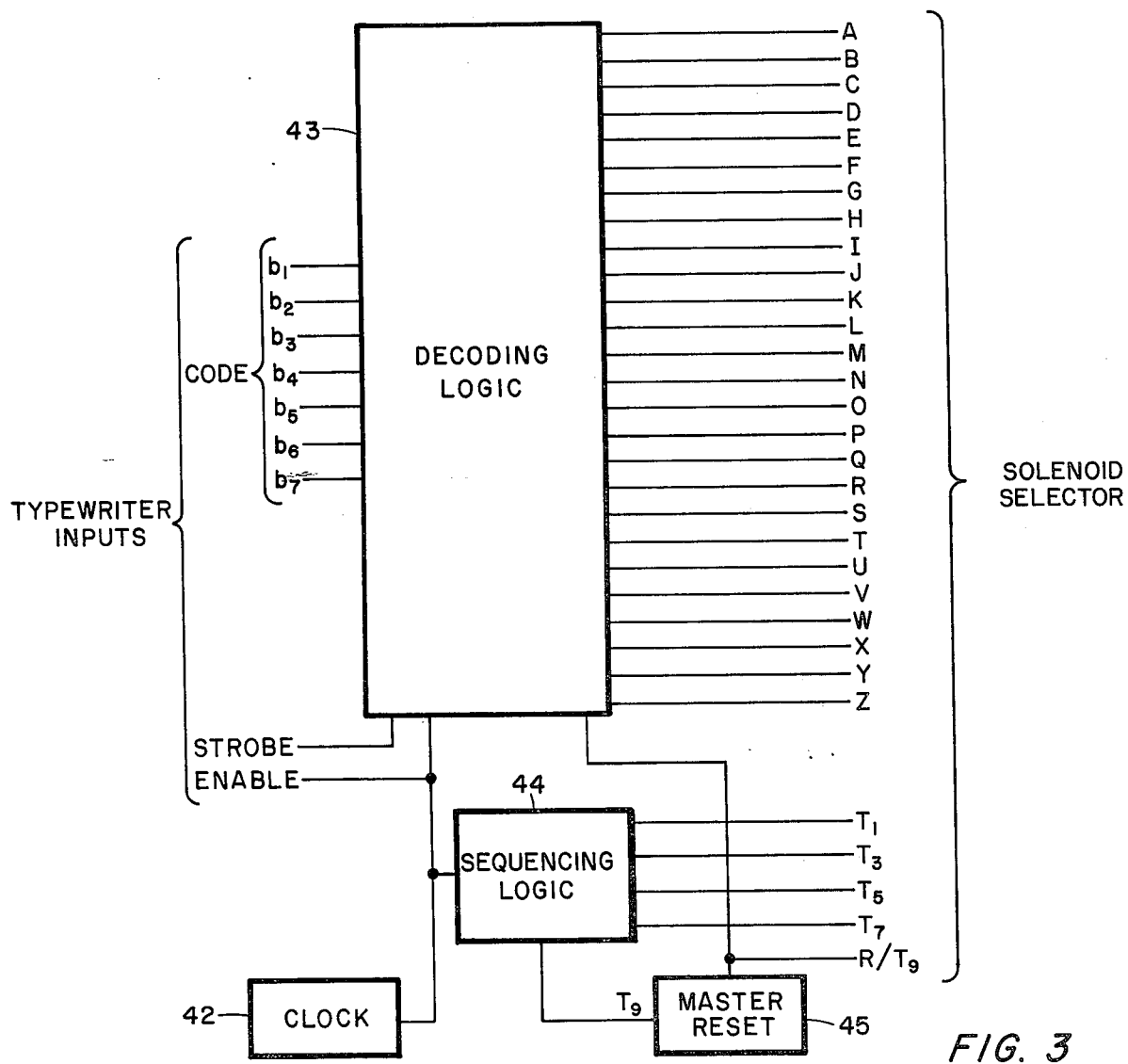
FIG. 3 is a more detailed block diagram showing all inputs from the typewriter keyboard through the decoding logic to the solenoid selector of FIG. 2.

The standard output from the typewriter keyboard 41 is in straight binary as is illustrated in TABLE II and TABLE IIa shown in FIGS. 8 and 8a on page 18 for each letter being formed. Upon receiving the appropriate clock pulse from clock 42, a letter typed on the typewriter keyboard 41 will be fed into the decoding logic 43. By viewing FIGS. 2 and 3 in combination, a better understanding of the decoding logic can be obtained. All of the binary inputs from the typewriter feed directly into the decoding logic 43 when an enable pulse is received from the clock 42. Upon receipt of a strobe pulse from the decoding logic 43 by the typewriter keyboard 41, which strobe pulse is controlled by the clock sequencing 44 and master reset 45 (as will be explained in more detail hereinafter), the binary output from the typewriter keyboard feeds into decoding logic 43 via coded inputs $b_1$–$b_7$. The decoding logic 43 utilizes standard off-the-shelf components for converting straight binary to individual characters representing the letters typed in typewriter keyboards. Such standard components could include a Motorola integrated circuit sold under part no. MC14515.

Clock 42 is an oscillator that generates a number of pulses per second and is enabled by the decoding logic. By use of a binary-coded-decimal to 1–10 converter in the sequencing logic 44, a series of clock pulses are generated from the sequencing logic 44. On the first clock pulse from clock 42, sequencing logic 44 generates an output pulse $T_1$ which feeds into solenoid selector 46. Likewise, on the third clock pulse received from clock 42, the sequencing logic 44 generates clock pulse $T_3$. Also, on the fifth, seventh and ninth clock pulses from clock 42, sequencing logic 44 generates clock pulses $T_5$, $T_7$ and $T_9$, respectively. Each of the outputs from the sequencing logic, $T_1$, $T_3$, $T_5$, $T_7$ and $T_9$ feed to the solenoid selector 46.

Upon receiving the ninth clock pulse from clock 42, the sequencing logic 44 will activate master reset 45 thereby resetting the decoding logic 43 and the solenoid selector 46, plus generating a strobe pulse to the typewriter keyboard 41 for strobing the next alphabetical character into the decoding logic 43. A standard component which can be used to form the sequencing logic 44 is an RCA integrated circuit sold under manufacturer's part no. CD4017. It should also be realized that master reset 45 may have a manual switch for the resetting of the logic thereby generating the $T_9$ or reset R pulse. The manual reset is necessary for resetting the logic upon turning power ON for the system.

It is estimated through testing of the electromechanical hand 16 with various individuals that are both deaf and blind that the time necessary (in the beginning) for the reading of each character of the one-hand manual alphabet is approximately 0.6 second. Therefore, within 0.6 of a second, it is necessary that the clock 42 generate a total of 10 clock outputs. (This may be increased as reading speed increases.) The power supply 47 supplies electrical power necessary for the typewriter keyboard 41, decoding logic 43, solenoid selector 46, master reset 45, sequencing logic 44 and clock 42.

The outputs for the decoding logic 43 are normally high. When a particular letter has been selected, that output will drop to 0. When a particular solenoid has been selected via the solenoid selector 46, a solenoid driver 95 amplifies the signal to operate the selected solenoid 96. Power for operation of the solenoid driver 95 and solenoid 96 may be received from previously mentioned power supply 47, but because of design considerations in generating more than one voltage level, it is more practical to receive power from a separate power supply 97.

Figure 4A:
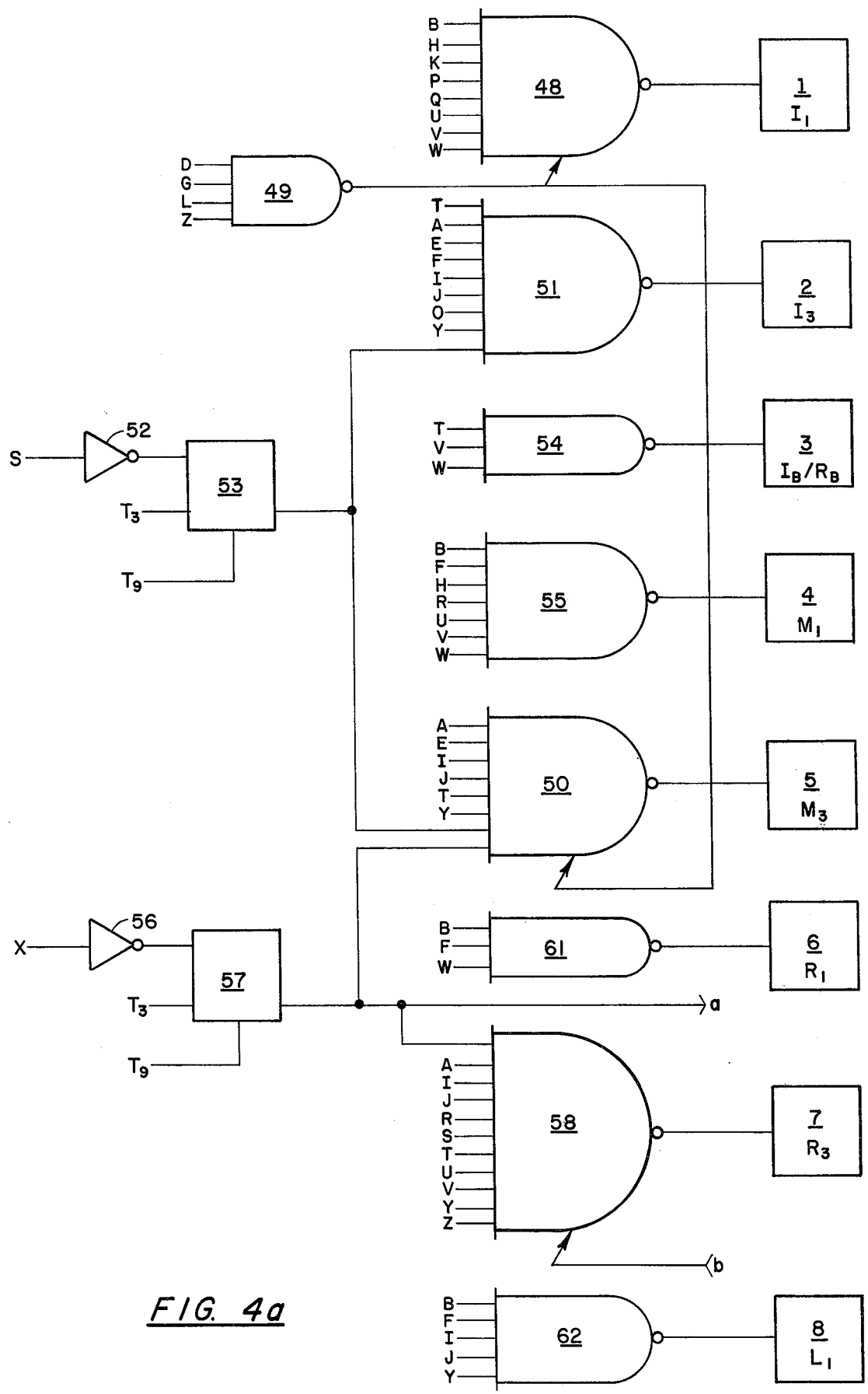
FIGS. 4a and 4b are detailed electrical schematics for the solenoid selector shown in FIG. 2.
Figure 4B:
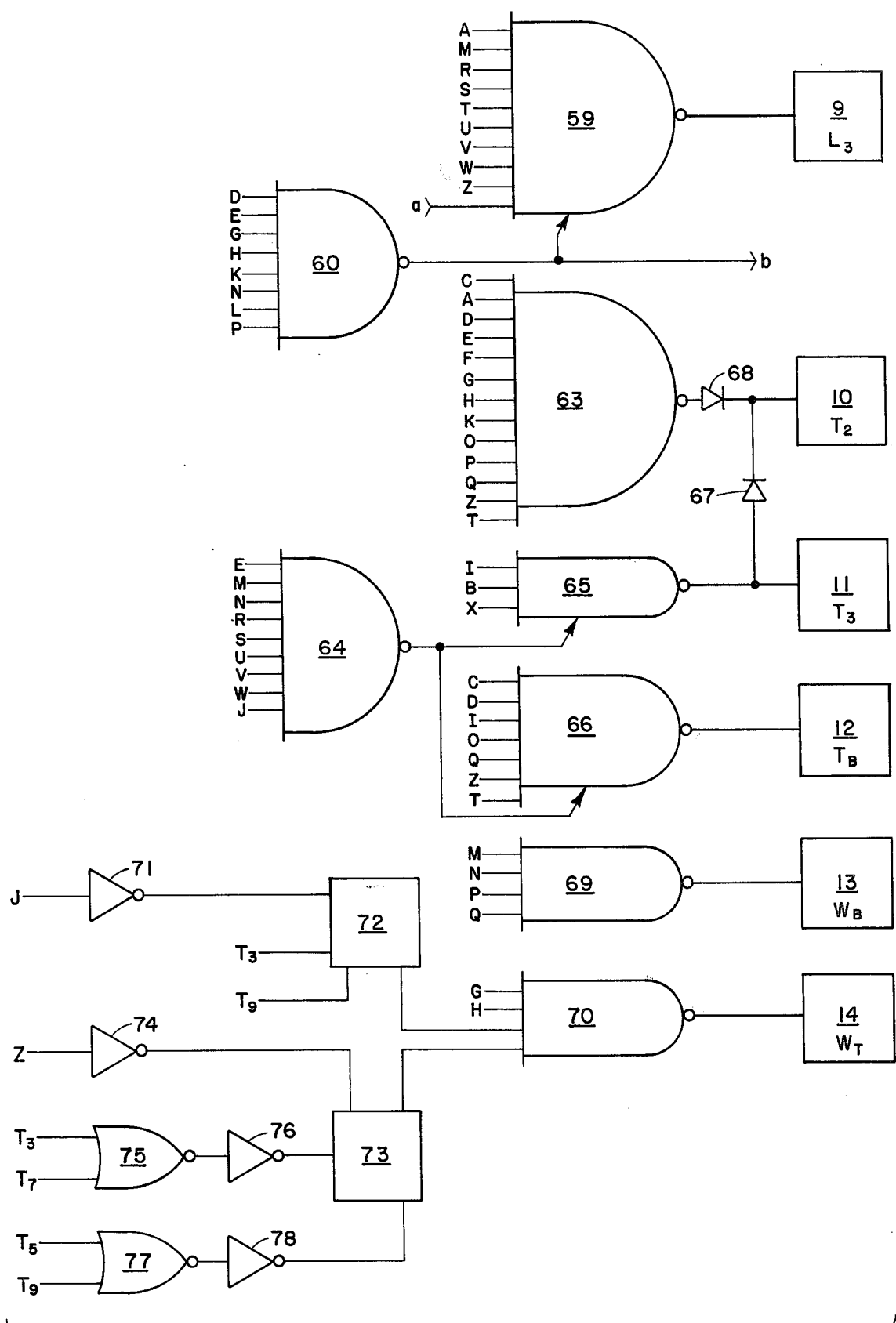

Referring to FIGS. 4a and 4b, the solenoid selector 46 will be explained in detail. The capital letters in FIGS. 4a–4b indicate connections to FIG. 3 as represented by the same capital letters, each capital letter being the same voltage line that corresponds to that particular letter being typed in the typewriter keyboard 41. Each reference to a solenoid hereinbelow will be referring to both the solenoid and its associated driver. Starting first with solenoid 1, if any of the inputs on NAND gate 48 drop to 0 indicating that letter had been selected, the output of NAND gate 48 would become high thereby energizing solenoid 1. Likewise, if any input for NAND gate 49 drops to 0 indicating that letter had been selected, the output of NAND gate 49 would become high thereby strobing NAND gate 48 to give a high output to energize solenoid 1, and strobing NAND gate 50 to generate a high output therefrom turning ON solenoid 5.

If any input for NAND gate 51 goes low indicating that letter has been selected, the output of NAND gate 51 becomes high thereby turning ON solenoid 2. The letter S which connects through inverter 52 to flip-flop 53 is delayed until time $T_3$ if the letter S is selected. The flip-flop 53, which would be turned ON at time $T_3$, would be reset at time $T_9$. Therefore, if the letter S is selected, the output of NAND gate 51 would go high after a delay of three clock pulses until time $T_3$. Likewise, the S input for NAND gate 50 would be delayed until time $T_3$ for energizing solenoid 5.

If any of the inputs for NAND gate 54 goes low indicating that letter has been selected, the output for NAND gate 54 would become high thereby energizing solenoid 3. If any of the inputs for NAND gate 55 goes low indicating that letter has been selected, the output for NAND gate 55 will go high energizing solenoid 4. If any of the inputs for NAND gate 50 are selected, other than the previously described inputs, the output of NAND gate 50 becomes high thereby energizing solenoid 5. The letter X which feeds to NAND gate 50 through inverter 56 and flip-flop 57 is delayed until clock pulse $T_3$ thereby energizing solenoid 5 only after a delay until clock pulse $T_3$. Likewise, the letter X is delayed to NAND gate 58 which controls solenoid 7 and to NAND gate 59 via connection "a" which controls solenoid 9. Therefore, upon selection of the letter X, the energization of solenoids 5, 7 and 9 will be delayed by the flip-flop 57 until clock pulse $T_3$, which flip-flop 57 is reset at time $T_9$.

If any other letter inputs for NAND gate 58 are selected other than the letter X, the output for NAND gate 58 will immediately go high thereby energizing solenoid 7. If any of the letters received in NAND gate 60 are selected, the output of NAND gate 60 will go high, which output will strobe NAND gates 59 and 58 ON via connection "b" thereby energizing both solenoids 7 and 9. If any of the inputs on NAND gate 61 are selected, the output of NAND gate 61 will go high energizing solenoid 6. Likewise, if any of the inputs for NAND gate 62 are selected, the output for NAND gate 62 will go high thereby energizing solenoid 8. Other than the previously described inputs for NAND gate 59, if any other letters are selected thereby causing the particular input to go low, the output of NAND gate 59 will go high thereby energizing solenoid 9.

If any of the inputs for NAND gate 63 are selected, the output for NAND gate 63 will go high thereby energizing solenoid 10. If any of the inputs for NAND gate 64 are selected, NAND gates 65 and 66 are strobed ON thereby energizing solenoids 11 and 12, respectively. Any time NAND gate 65 is ON to energize solenoid 11, solenoid 10 will also be energized through diode 67. Diode 68 prevents the output of NAND gate 65 from feeding back to NAND gate 63. Therefore, solenoid 10 will always be energized if solenoid 11 is energized. Other inputs for NAND gate 65 or NAND gate 66 will energize solenoids 11 and 12, respectively. If any of the inputs for NAND gate 69 are selected, the output of NAND gate 69 will go high thereby energizing solenoid 13.

If the letters G or H are selected, NAND gate 70 will immediately go high thereby energizing solenoid 14. However, if the letter J is selected, the energization of solenoid 14 will be delayed until time $T_3$ via inverter 71 and flip-flop 72. Flip-flop 72 will be set upon receiving clock pulse $T_3$ and reset by clock pulse $T_9$. If the letter Z is selected, a high input will exist for flip-flop 73 via inverter 74. A low output from flip-flop 73 will turn NAND gate 70 ON at time $T_3$ because of the clock pulse received through NOR gate 75 and inverter 76. The flip-flop 73 will then be reset at clock pulse $T_5$ via NOR gate 77 and inverter 78 thereby de-energizing solenoid 14 at time $T_5$. However, solenoid 14 will be reenergized at time $T_7$ via NOR gate 75 and inverter 76. Again, flip-flop 73 will be reset at time $T_9$ via NOR gate 77 and inverter 78 thereby de-energizing solenoid 14.

Motion created by solenoid 14 upon receiving the letter Z will appear as a sequenced motion that occurs at $T_3$ and $T_5$.

The energization of any of the solenoids 1–14 will cause the respective cable given in TABLE I to be pulled thereby causing motion of the hand 18 to form the letters of the one-hand manual alphabet. The selection of the proper solenoids to form each of the letters of the one-hand manual alphabet is determined by the solenoid selector 46 as described in detail hereinabove. The forming of illustrative letters of the one-hand manual alphabet will be demonstrated in more detail subsequently.

Figure 5:
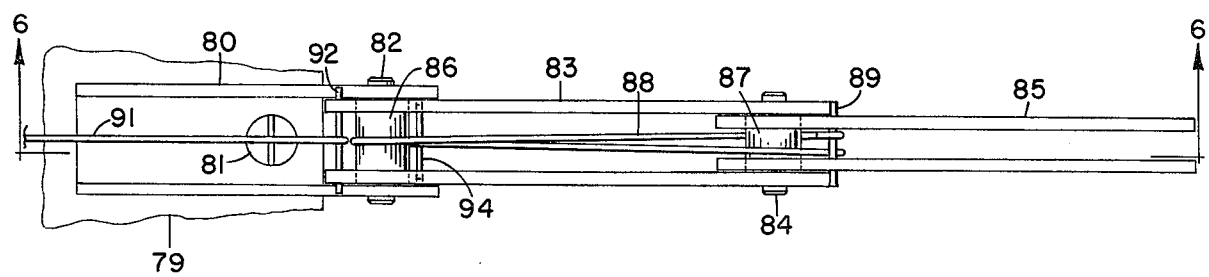
FIG. 5 is a top view of a finger with the outer surface removed.
Figure 6:
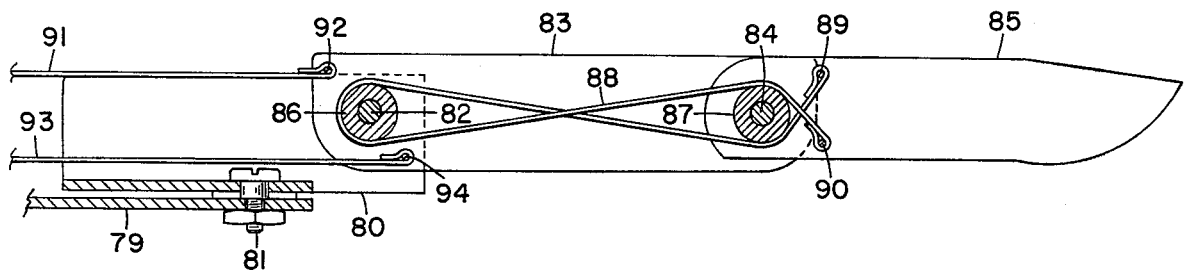
FIG. 6 is a sectional view of FIG. 5 along section lines 6—6.

FIG. 1 simply shows the fingers in a diagramatic illustration, but does not show the mechanical structure internal to the finger. Referring to FIGS. 5 and 6 in combination, one possible mechanical configuration of the fingers is shown therein. In FIGS. 5 and 6, the covering of the fingers, which could be similar to the covering of an anthropomorphic dummy, has been removed. A base plate 79 extends outward inside hand 18 on which finger support 80 is mounted by any suitable means, such as screw 81. Pivot pin 82, which is anchored in finger support 80, pivotally supports first extension 83 of the finger. On the opposite end of first extension 83 from pivot pin 82 is located a second pivot pin 84 mounted thereon. Pivotally connected on pivot pin 84 is a second extension 85. First extension 83 and second extension 85 form the structure for the fingers. It should be noted that the joint of the finger closest to the finger tip has been maintained stiff and merely simulated by a small angle in second extension 85.

Around pivot pin 82 is located a sleeve 86 that is fixed with respect to first extension 83. Likewise, sleeve 87 around pin 84 is fixed with respect to second extension 85. A line 88 is tightly drawn in a cross configuration over sleeves 86 and 87 as shown with the ends being anchored to stop pins 89 and 90. By pulling on cable 91 that is anchored to stop pin 92 of first extension 83, first extension 83 will be pulled to the horizontal position as shown in FIG. 6. Likewise, because of the friction between line 88 and sleeves 86 and 87, second extension 85 will also be moved to the horizontal position as shown in FIG. 6. Contrary, if cable 93 is pulled which is anchored to pin 94 of first extension 83, first extension 83 will be moved clockwise around pin 82. Again, because of the friction between line 88 and sleeves 86 and 87, the second extension 85 will be moved clockwise around pin 84. Such clockwise motion will "close" the finger.

It should be realized that many other methods of construction of the individual fingers may exist, including the use of levers, pulleys, gears or many other mechanical connections.

Figure 7A:
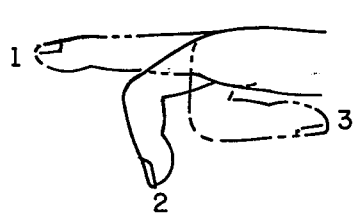
FIGS. 7a–7d illustrate different possible positions for the fingers and thumb on the electromechanical hand.
Figure 7D:
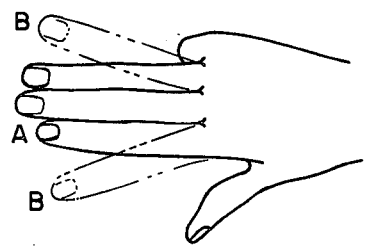
Figure 7B:
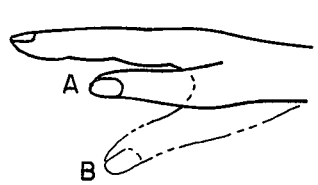
Figure 7C:
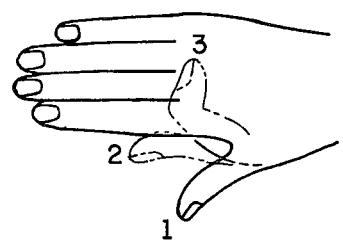
Figure 9:
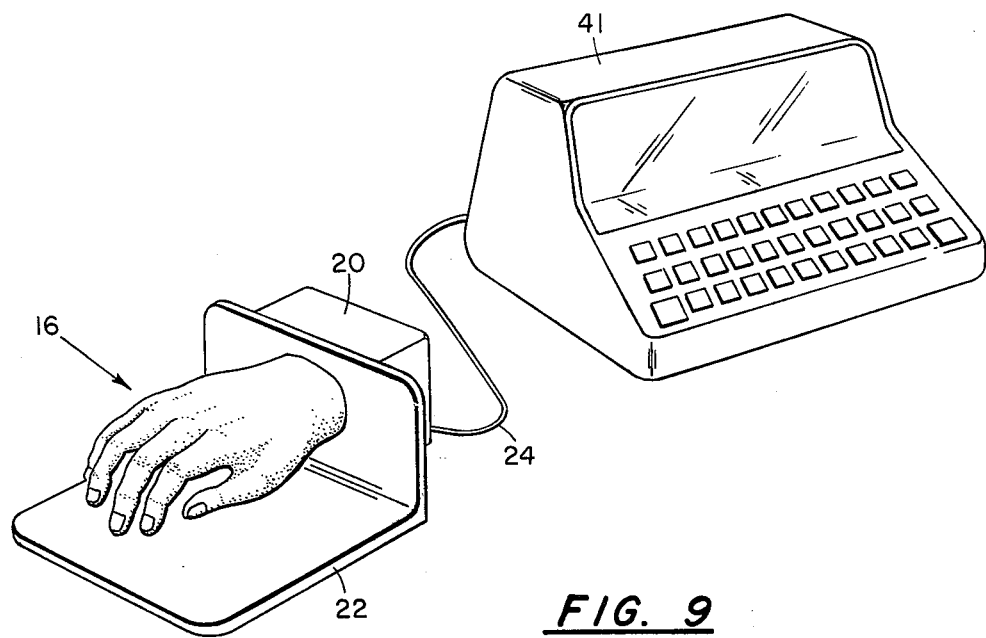
FIG. 9 shows a pictorial view of a mechanical hand of the invention.

Referring now to FIGS. 7a–7d, the various positions of the fingers and thumb are shown. FIG. 7a, which shows a side view of a finger, illustrates the three vertical positions of the finger. FIG. 7b, which shows a side view of the hand, illustrates the vertical positions of the thumb. FIG. 7c, which shows a top view of the hand, illustrates the horizontal positions of the thumb. FIG. 7d, which shows a top view of the hand, illustrates the horizontal positions of the index and ring fingers, both of which are simultaneously moved by solenoid 3.

METHOD OF OPERATION

Assume that the letter A has been typed on the typewriter keyboard 41. To form the letter A in the one-hand manual alphabet, reference is made to the incorporated reference of *Talk To The Deaf*. The ASC II binary output for the typewriter keyboard for the letter A is shown as zeros and ones for the information lines $b_1$–$b_7$ in TABLE II and TABLE IIa. The decoding logic 43 converts the output from the typewriter keyboard 41 to give a low output for the letter A which is fed into the solenoid selector 46. As can also be seen in TABLE II, for the proper formation of the letter A in the one-hand manual alphabet, solenoids 2, 5, 7, 9 and 10 should be energized. This corresponds to the index finger being in the 3A position, the middle finger being in the 3 position, the ring finger being in the 3A position, the little finger being in the 3 position, the thumb being in the 2A position and the wrist being in the 1A position, all of which are given in TABLE II. Therefore, all of the fingers will be closed with the thumb pressed thereagainst to form the letter A in the one-hand manual alphabet.

Assume now that the letter S is selected. After decoding the ASC II binary output from the typewriter keyboard 42 via the decoding logic 43, a low output will be given for the letter S. The low output for the letter S will immediately energize solenoids 7, 9, 10, 11 and 12, thereby causing the ring finger to move to the 3A position, the little finger to move to the 3 position, the thumb to move to the 3B position. Thereafter, at time $T_3$, the index finger will move to the 3A position and the middle finger will move to the 3 position, thereby forming the letter S for the one-hand manual alphabet.

Assume now that the letter Z is selected by the typewriter keyboard 41, which letter is strobed into the decoding logic 43. Immediately, the solenoid selector 46 will energize solenoids 1, 5, 7, 9, 10 and 12 thereby moving the index finger to the 1A position, the middle finger to the 3 position, the ring finger to the 3A position, the little finger to the 3 position, and the thumb to the 2B position. Thereafter at time $T_3$, solenoid 14 will be energized moving the entire hand to the right in a motion simulating a pivot of the wrist. At time $T_5$, solenoid 14 will be de-energized allowing the hand to return to its normal position; however, solenoid 14 will again be reenergized at time $T_7$, again moving the entire hand to the right to form a sequencing motion illustrating the letter Z of the one-hand manual alphabet.

By following any particular letter from the typewriter keyboard through the truth table shown as TABLE II, a person can see in advance which solenoids will be activated thereby seeing the configuration of the hand. The configuration of the hand will approximate the one-hand manual alphabet as shown in the incorporated reference, which one-hand manual alphabet is the standard means for communication with the deaf and blind.

By use of the apparatus described hereinabove, any individual can communicate with a deaf and blind person practiced in the one-hand manual alphabet. Since the one-hand manual alphabet is the standard means for communicating with the deaf and blind, by use of the apparatus described hereinabove, the deaf and blind can communicate with almost anyone. Reversed communication from the deaf and blind to another person not so handicapped can be a simple typewritten message on a typewriter.

While the apparatus and method described hereinabove relates to the forming of letters of the English language, any given character may be formed with the apparatus. The character may be a number or letter of any language that can be represented with one-hand gestures. Minor circuitry changes or pivotal changes may have to be made to form other alphanumeric characters.

We claim:

1. A method for communicating with persons who understand the one-hand manual alphabet, consisting of the following steps:
   generating a coded signal for a preselected alphanumeric character, said preselected alphanumeric character being one of a plurality of alphanumeric characters;
   converting said coded signal to generate a single output for said preselected alphanumeric character;
   moving a mechanical hand in response to said single output to form said preselected alphanumeric character in said one-hand manual alphabet;
   reading said preselected alphanumeric character by feeling said mechanical hand.

2. The method of communicating with persons as given in claim 1 including after converting step an additional step of selecting appropriate actuating devices to move mechanical hand.

3. The method of communicating with persons as given in claim 2 including the additional step of clocking said single output for said preselected alphanumeric character into said mechanical hand to give delayed movement to component parts thereof.

4. The method of communicating with persons as given in claim 3 further including as a first step a resetting of all control logic so that said mechanical hand will begin the forming of said preselected alphanumeric character from a rest position.

5. The method of communicating with persons as given in claim 1 wherein said generating step includes typing of said preselected alphanumeric character into an electric keyboard to generate said coded signal.

6. An apparatus for communicating with persons via the one-hand manual alphabet, said apparatus comprising:
   a source of power;
   means connected to said source of power for generating coded signals for each alphanumeric character, each alphanumeric character being one of a plurality of alphanumeric characters;
   electronic means receiving and converting said coded signals to separate single output signals in response to each alphanumeric character received;
   driver means receiving said separate single output signals;
   mechanical hand means connected to said driver means, said driver means moving said mechanical hand means to form each alphanumeric character in said one-hand manual alphabet.

7. The apparatus as given in claim 6 wherein said electronic means includes decoding logic which receives and decodes said coded signal to give said separate single outputs for each alphanumeric character.

8. The apparatus as given in claim 7 wherein said driver means includes a number of individual drivers, said apparatus further including selector means to actuate predetermined individual drivers for each alphanumeric character.

9. The apparatus as given in claim 8 further including clock means connected to decoding logic and selector means for timing said actuation of said predetermined individual drivers for each alphanumeric character.

10. The apparatus as given in claim 9 wherein said mechanical hand is an anthropomorphic dummy with pivot means simulating joints in a hand, said anthropomorphic dummy being pivoted about said pivot means by said driver means.

11. The apparatus as given in claim 10 wherein said individual drivers are solenoids, said solenoids being connected to individual cables that also attach to said mechanical hand, upon actuation of any of said solenoids, said actuated solenoid pulls its individual cable to cause a given movement of said mechanical hand.

12. The apparatus as given in claim 6 wherein said means for generating includes a typewriter keyboard for generating said coded signals.

* * * * *